(12) United States Patent
Patel et al.

(10) Patent No.: US 10,711,070 B1
(45) Date of Patent: Jul. 14, 2020

(54) METHOD FOR PREPARING SPHERICAL CELLULOID BEADS

(71) Applicant: U.S. Government as Represented by the Secretary of the Army, Picatinny Arsenal, Dover, NJ (US)

(72) Inventors: Subhash Patel, Piscataway, NJ (US); Viral Panchal, Parlin, NJ (US); Ming-Wan Young, Basking Ridge, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 135 days.

(21) Appl. No.: 15/465,945

(22) Filed: Mar. 22, 2017

(51) Int. Cl.
    *C08B 15/00* (2006.01)
    *C08B 15/06* (2006.01)
    *B01F 17/00* (2006.01)

(52) U.S. Cl.
    CPC ............ *C08B 15/06* (2013.01); *B01F 17/005* (2013.01)

(58) Field of Classification Search
    None
    See application file for complete search history.

(56) References Cited

U.S. PATENT DOCUMENTS

| | | | | |
|---|---|---|---|---|
| 1,830,944 A | * | 11/1931 | Immerheiser | C09D 101/08 106/169.01 |
| 4,146,499 A | * | 3/1979 | Rosano | A01N 25/04 166/270.1 |
| 8,597,444 B1 | | 12/2013 | Young et al. | |
| 8,696,838 B1 | | 4/2014 | Faridi et al. | |
| 2004/0208906 A1 | * | 10/2004 | Tatara | A61K 9/0014 424/401 |
| 2005/0260272 A1 | * | 11/2005 | Figueiredo | A61K 9/1641 424/489 |
| 2007/0003502 A1 | * | 1/2007 | Tanabe | A61K 8/0212 424/70.13 |
| 2011/0021592 A1 | * | 1/2011 | Magdassi | A61K 9/1075 514/406 |
| 2012/0028910 A1 | * | 2/2012 | Combal | A61K 9/0048 514/20.5 |

FOREIGN PATENT DOCUMENTS

WO    WO-2014019083 A1 *    2/2014    ......... A61L 31/127

* cited by examiner

*Primary Examiner* — Stefanie J Cohen
(74) *Attorney, Agent, or Firm* — Lisa H. Wang

(57) ABSTRACT

A wet chemistry method for preparing spherical celluloid beads by mixing a water-based suspension solution and a solvent based celluloid solution that is immiscible in the suspension solution. The two combined solutions create an "oil-in-water" type mixture where the dispersed phase consists of celluloid dissolved in solvent and co-solvent that is suspended in the continuous water phase. Agitation and removal of the solvent and co-solvent mixture produces spherical shaped celluloid beads.

8 Claims, 1 Drawing Sheet

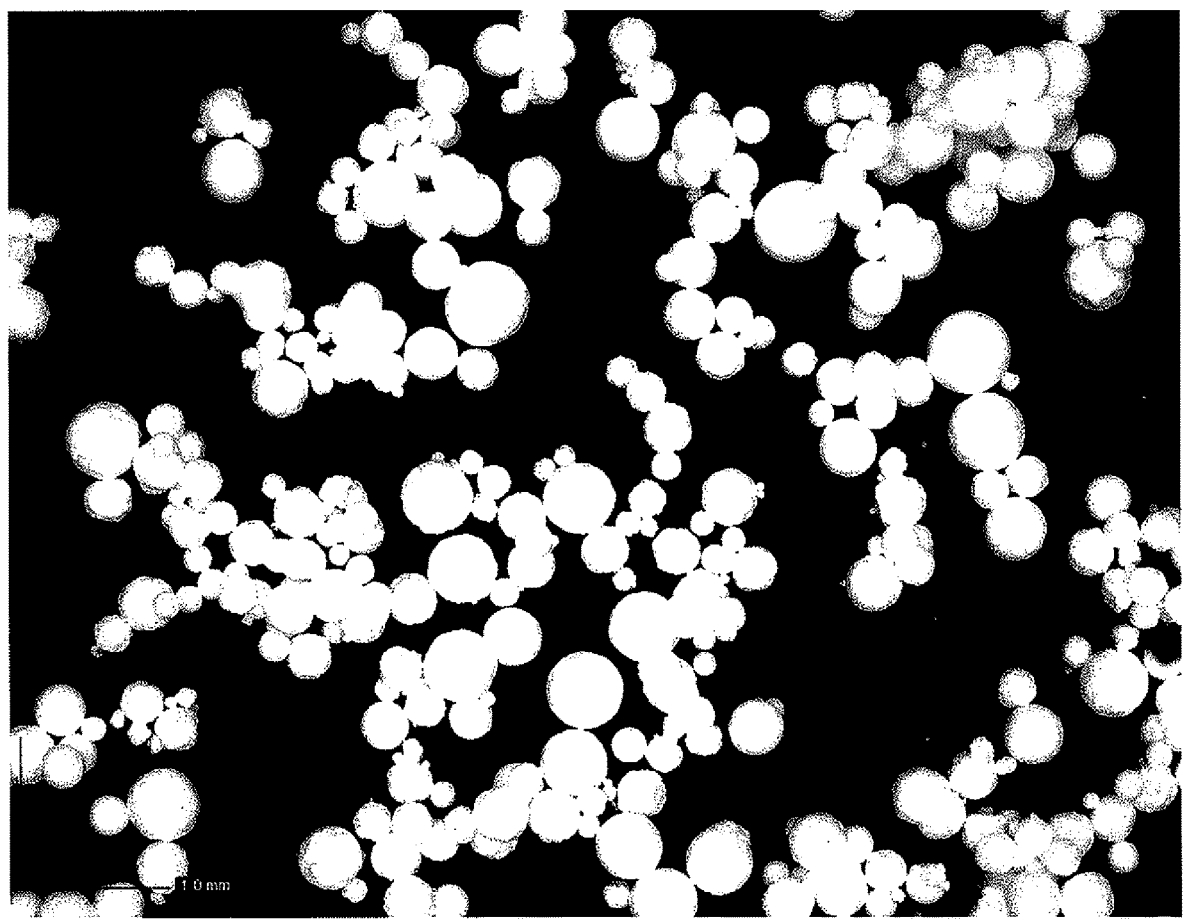

METHOD FOR PREPARING SPHERICAL CELLULOID BEADS

The inventions described herein may be manufactured and used by or for the United States Government for government purposes without payment of any royalties.

FIELD OF INVENTION

The present invention relates generally to celluloid and more specifically to methods to prepare spherical celluloid beads using a wet chemistry solvent and suspension process.

BACKGROUND OF THE INVENTION

Celluloid is primarily produced through mixing of industrial grade nitrocellulose (NC) and camphor in the presence of suitable solvents like ethanol and acetone. U.S. Pat. No. 8,696,838 issued to Niloufar Faridi et al (the '838 patent) describes mixing nitrocellulose and camphor to produce celluloid. The bulk celluloid material is then processed by straining, roll milling, and "hiding" into desired sheets of celluloid. A typical process for preparing the celluloid sheets starts with selecting a certain number of "hides" which are then blocked and fused at a desired pressure and temperature. The blocks are then sliced into sheets at a desired thickness after a conditioning period. Alternatively, celluloid can be manufactured by "film casting," which involves mixing nitrocellulose, camphor, and other ingredients; and subsequently casting and drying the bulk mixture into a film of a desired thickness. These sheets of celluloid, however, cannot be easily formed into large complex geometries or efficiently stored. Thus, a need exists for a spherical celluloid bead material for ease of processing and storage.

There are several mechanical means to prepare bead-like celluloid material. One method is to pin-punch celluloid sheets to produce "chads" of celluloid bead material. The chads are cylindrical in shape and difficult to achieve at sizes below 1.5 mm×0.8 mm. Alternatively, sheets of celluloid material may also be ground and pulverized. The resulting material, however, are irregular in shape with rough edges and angled surfaces requiring further milling, which is time consuming and inefficient. Bead-like celluloid may also be prepared by an extrusion process similar to propellant manufacturing techniques as disclosed in the '838 patent. This process mixes all the ingredients in a batch mixer with solvents. NC and a plasticizer, preferably camphor, are mixed in an organic solvent, such as ethanol and/or acetone along with a stabilizer and a chemical blowing agent. Once a dough-like mix is formed, the material is blocked in a standard hydraulic block press and extruded through a die with desired dimensions in a form of strands, similar in shape to spaghetti. These strands are then cut to a desired length, targeting a length to diameter (L/D) ratio of close to one.

While these mechanical celluloid bead processing techniques have been shown to be effective, they are time consuming and result in lower than optimal yield. These methods also do not achieve an ideal spherical geometry. Therefore, a need exists to prepare celluloid beads that overcome such drawbacks.

SUMMARY OF THE INVENTION

The object of this invention is to provide a method for preparing celluloid beads having a spherical geometry using a solvent and suspension process. The water based suspension solution is prepared by mixing water with a suspending agent. The solvent based celluloid solution is prepared by dissolving celluloid in a solvent and co-solvent, and is immiscible in water. The suspension solution and celluloid solutions are mixed to form a system having droplets of celluloid dissolved in solvent and co-solvent that are suspended in the water based suspension solution. Spherical celluloid beads are obtained upon removal of the solvent and co-solvent from the system at elevated temperatures.

BRIEF DESCRIPTION OF THE DRAWINGS

Further features and advantages of the present invention may be understood from the drawings.

FIG. 1 shows the celluloid beads made from the wet chemistry method.

DETAILED DESCRIPTION

Disclosed herein is a wet chemistry method for preparing celluloid beads having a spherical geometry by the following steps:
(a) preparing a water-based suspension solution;
(b) preparing a celluloid solution that is immiscible with water,
(c) adding the celluloid solution to the water-based suspension solution to create an "oil-in-water" type system wherein the celluloid is suspended as droplets in the water-based suspension solution;
(d) agitating the "oil-in-water" system
(e) removing the "oil" in the "oil-in-water" type system at elevated temperatures; and
(f) recovering the celluloid beads.

The disclosed wet chemistry process capitalizes on the immiscibility of an "oil-in-water" type system to create droplets of celluloid that are suspended in the suspension solution. Agitation of the suspended celluloid droplets along with evaporation of the "oil" in the form of a solvent and co-solvent from the celluloid droplets produces beaded celluloid material.

Water Based Suspension Solution

The water-based suspension solution is prepared by mixing water with a suspending agent to increase the density of the solution to greater than the density of water alone. Preferably the density of the suspension solution should be about 1.1 to about 1.2 $g/cm^3$ compared to water which is 1.0 $g/cm^3$. The suspending agent is a water soluble material that increases the density and viscosity of water and lowers the interfacial tension of celluloid droplets in an "oil-in-water" type system. Examples of suspending agents include natural materials such as gelatin, acacia, tragacanth, starch, sea weed; semi-synthetic agents such as substituted cellulose (minerals), hydroxyethylcellulose, sodium carboxymethylcellulose, methylcellulose, and microcrystalline cellulose; and synthetic agents such as synthetic polymers including carboxypolymethylene (carbopol), polyvinyl alcohol, polyvinyl pyrolidone iodine complex. Gelatin is a preferred suspending agent.

The suspension solution may be prepared at room temperature or slightly warmed above room temperature. If warmed, the temperature may be heated to 30° C. to 40° C. before adding the celluloid solution.

Celluloid Solution

The celluloid solution is prepared by dissolving celluloid in a solvent and a co-solvent. The density of the celluloid solution should be equal to or slightly greater than the density of the suspension solution. Any solvents and co-solvent selected for this mixture must: 1) be capable of solvating the celluloid (nitrocellulose and camphor), 2) be immiscible in water, 3) have a boiling point less than water, and 4) be miscible with each other. Exemplary solvents include ethyl acetate and tetrahydrofuran (THF) with ethyl acetate being preferred. Exemplary co-solvents include, dichloromethane ($CH_2Cl_2$) carbon tetrachloride ($CCL_4$), chloroform ($CHCl_3$), with $CCL_4$ being preferred. The celluloid solution may be composed of 1% up to 25% celluloid with the remainder being composed of solvent and co-solvent at about 75% to 99%.

Colored dyes and stabilizers may be added to the cellulose solution. Antioxidants and stabilizers may be added during celluloid synthesis to minimize any degradation of the nitrocellulose. Exemplary stabilizers include 1-methyl-3,3-diphenylurea (aka Akardite II) and ethyl centralite.

Oil-in-Water Type System

The oil-in-water type system is prepared by mixing together the celluloid solution with the water-based suspension solution to create a two phase system comprising a dispersed phase (the celluloid solution) and a continuous phase (suspension solution). Any manner of introducing the celluloid solution to the suspension solution is permissible so long as distinct droplets of celluloid are suspended within the suspension solution. The celluloid solution may be added dropwise (e.g. by injection) into the suspension solution to generate discrete celluloid droplets in the continuous phase. The continuous phase should be agitated to achieve a desired droplet size and maintain the discrete nature of the celluloid droplet dispersed within. As the celluloid droplets are agitated, the temperature of the oil-in-water type system may be slowly raised (below the boiling point of water, 100° C., but above the boiling point of the solvent and co-solvent) to evaporate the solvent and co-solvent in the celluloid droplet. The resulting spherical beads are isolated, filtered and washed with water, and dried.

The formation of celluloid beads and the size of the beads formed can be controlled by modifying the following factors: agitating or stirring speed, pH value of the suspension solution, temperature, solubility of ingredients, and stability of suspending agent at working temperature.

Example 1

A two liter beaker is prepared by placing baffles inside the beaker. The baffles assist with breaking up the horizontal circular flow pattern and minimize vortex formation (minimize agglomeration/fusion of beads). The beaker is filled with water (distilled, filtered or tap). A 200 ml to 400 ml of gelatin solution at 1% to 3% is added to 1600 to 1800 ml water to prepare the suspension solution having a density value greater than the value of water alone. The solution is mixed using a mechanical stirrer at a speed of ~150-170 rpm, at 40° C., in a beaker that is kept in a water bath with a wired screen placed under the beaker. The water bath is heated on a hot plate. In a separate vessel 6 wt % to 9.5 wt % celluloid solution is prepared by dissolving celluloid in ethyl acetate. Carbon tetrachloride ($CCL_4$) is then added to the mixture in order to adjust the density of celluloid solution, so that droplets remain suspended in suspension solution, rather than floating to the surface. Since the density of ethyl acetate is lower (0.902 g/cc) than that of water, the droplet will remain floating if $CCL_4$ is not added. The solution is thoroughly mixed to ensure a homogenous solution mixture. The celluloid solution (celluloid, ethyl acetate and $CCl_4$) is slowly injected into the suspension solution using a 23 ml long pipet. To ensure ideal suspension of the celluloid droplets, the celluloid solution should exit the pipet at a level where the stirrer is placed (lower than middle of beaker). The size of the beads is controlled by the speed of the stirring mechanism. Once the suspension of celluloid droplets is stable and a desired bead sized is obtained, the temperature of the beaker may be raised slowly above the boiling point of the co-solvent and solvent to evaporate them from the system. Stirring or agitating the system may continue during the evaporation stage. A slow stream of inert gas such as nitrogen may be applied to the system to assist in faster removal of the co-solvent and solvent. After the co-solvent and solvent are removed, the beaded celluloid material in solution is cooled down to room temperature. The beads are isolated, filtered, and dried.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description but by the claims and any equivalents.

What is claimed is:

1. A method of preparing solid, spherical celluloid beads comprising:
   a. preparing a suspension solution consisting essentially of water and gelatin wherein the gelatin is dissolved in the water and the density of the suspension solution is about 1.1 $g/cm^3$ to 1.2 $g/cm^3$ compared to water at 1.0 $g/cm^3$;
   b. preparing a celluloid solution comprising celluloid in a solvent and adding a co-solvent to adjust the density of the celluloid solution to about 1.1 $g/cm^3$ to 1.59 $g/cm^3$, compared to water at 1.0 $g/cm^3$, wherein the density of the celluloid solution is equal to or greater than the density of the suspension solution, wherein the celluloid is dissolved in the solvent and the co-solvent, and wherein the solvent and the co-solvent are miscible with each other, immiscible in water, and have a boiling point lower than water;
   c. adding the celluloid solution to the suspension solution to form droplets of the celluloid wherein the droplets of the celluloid are suspended in the suspension solution to create a system;
   d. agitating the system to create an agitated system comprising droplets of the celluloid suspended in the suspension solution;
   wherein the droplets of the celluloid are spherical; and
   e. heating the agitated system to between 25° C. and less than the boiling point of water to remove the solvent and the co-solvent from the agitated system to form solid, spherical celluloid beads wherein the diameter of the solid, spherical celluloid beads is about 0.14 mm to 1.02 mm.

2. The method of claim 1, wherein the solvent is selected from the group consisting of ethyl acetate, isopropyl acetate and methylacetate.

3. The method of claim 1, wherein the co-solvent is carbon tetrachloride or chloroform.

4. The method of claim 1, wherein the celluloid is comprised of nitrocellulose and camphor.

5. The method of claim 1, wherein the celluloid solution comprises about 1% to 25% celluloid and the remainder comprises 75% to 99% of a mixture of the solvent and the co-solvent.

6. Spherical celluloid beads prepared by the method of claim 1.

7. The method of claim 1, wherein the solid, spherical celluloid beads are isolated from the suspension solution.

8. A method of preparing solid, spherical celluloid beads comprising:
   a. preparing a suspension solution consisting essentially of water and gelatin wherein the gelatin is dissolved in the water and the density of the suspension solution is about 1.1 g/cm$^3$ to 1.2 g/cm$^3$ compared to water at 1.0 g/cm$^3$;
   b. preparing a celluloid solution comprising celluloid in ethyl acetate and adding carbon tetrachloride to adjust the density of the celluloid solution to about 1.1 g/cm$^3$ to 1.59 g/cm$^3$ compared to water at 1.0 g/cm$^3$, wherein the density of the celluloid solution is equal to or greater than the density of the suspension solution;
   c. adding the celluloid solution to the suspension solution to create a mixture;
   d. agitating the mixture to form an agitated mixture comprising spherical droplets of the celluloid suspended in the suspension solution; and
   e. heating the agitated mixture to remove the ethyl acetate and carbon tetrachloride from the agitated mixture to form solid, spherical celluloid beads in the suspension solution wherein the diameter of the solid, spherical celluloid beads is about 0.4 mm to 1.02 mm; and
   f. isolating the solid, spherical celluloid beads from the suspension solution.

* * * * *